(12) United States Patent
Lim

(10) Patent No.: US 12,305,687 B2
(45) Date of Patent: May 20, 2025

(54) L-SHAPED BOLT FASTENING STRUCTURE USING HOLE GUARD

(71) Applicant: GNI. Co.,Ltd., Hwaseong-si (KR)

(72) Inventor: Chang Su Lim, Hwaseong-si (KR)

(73) Assignee: GNI. CO., LTD. (KR)

( * ) Notice: Subject to any disclaimer, the term of this patent is extended or adjusted under 35 U.S.C. 154(b) by 160 days.

(21) Appl. No.: 18/143,603

(22) Filed: May 4, 2023

(65) Prior Publication Data
US 2024/0133417 A1 Apr. 25, 2024
US 2024/0229855 A9 Jul. 11, 2024

(30) Foreign Application Priority Data

Oct. 19, 2022 (KR) .................. 10-2022-0134880
Feb. 8, 2023 (KR) .................. 10-2023-0016573

(51) Int. Cl.
*F16B 43/02* (2006.01)
*F16B 33/00* (2006.01)
*F16B 35/04* (2006.01)

(52) U.S. Cl.
CPC .......... *F16B 35/041* (2013.01); *F16B 33/002* (2013.01); *F16B 43/02* (2013.01)

(58) Field of Classification Search
CPC .... F16B 35/041; F16B 35/044; F16B 33/002; F16B 43/02
USPC ........................................................ 411/424
See application file for complete search history.

(56) References Cited

U.S. PATENT DOCUMENTS

| 6,547,573 | B1 * | 4/2003 | Allen | H01R 4/64 |
| | | | | 439/92 |
| 6,874,288 | B1 * | 4/2005 | Washa | E04G 13/062 |
| | | | | 52/155 |
| 2002/0066620 | A1 * | 6/2002 | Lindsey | E06C 9/04 |
| | | | | 182/92 |
| 2007/0177956 | A1 * | 8/2007 | Laflamme | B60P 7/0892 |
| | | | | 410/108 |
| 2015/0060096 | A1 * | 3/2015 | Kovach | A01B 35/28 |
| | | | | 172/763 |
| 2018/0180084 | A1 * | 6/2018 | Chen | F16B 5/02 |
| 2020/0284029 | A1 * | 9/2020 | Drummond | E04B 1/4121 |
| 2023/0250844 | A1 * | 8/2023 | Lim | F16B 43/00 |
| | | | | 411/337 |

FOREIGN PATENT DOCUMENTS

KR            100730721 B1      6/2007

* cited by examiner

*Primary Examiner* — Jason W San
*Assistant Examiner* — Dil K. Magar
(74) *Attorney, Agent, or Firm* — Renaissance IP Law Group LLP

(57) ABSTRACT

Provided is an L-shaped bolt fastening structure using a hole guard, which is capable of being installed in holes having various sizes. Since an L-shaped bolt is fastened in a state in which a hole guard is mounted on a lower structure, fastening using the L-shaped bolt is applicable to a steel pad having a large hole or a large long hole or a grating in which holes are damaged and have irregular sizes. Since bolts can be installed in holes having various sizes in one direction using the hole guard and the L-shaped bolt, the L-shaped bolt fastening structure using the hole guard has a wide range of applications in a floor in an industrial site and as a hook hanger or the like of an H-beam structure, a ceiling, or a wall structure of a construction site.

18 Claims, 12 Drawing Sheets

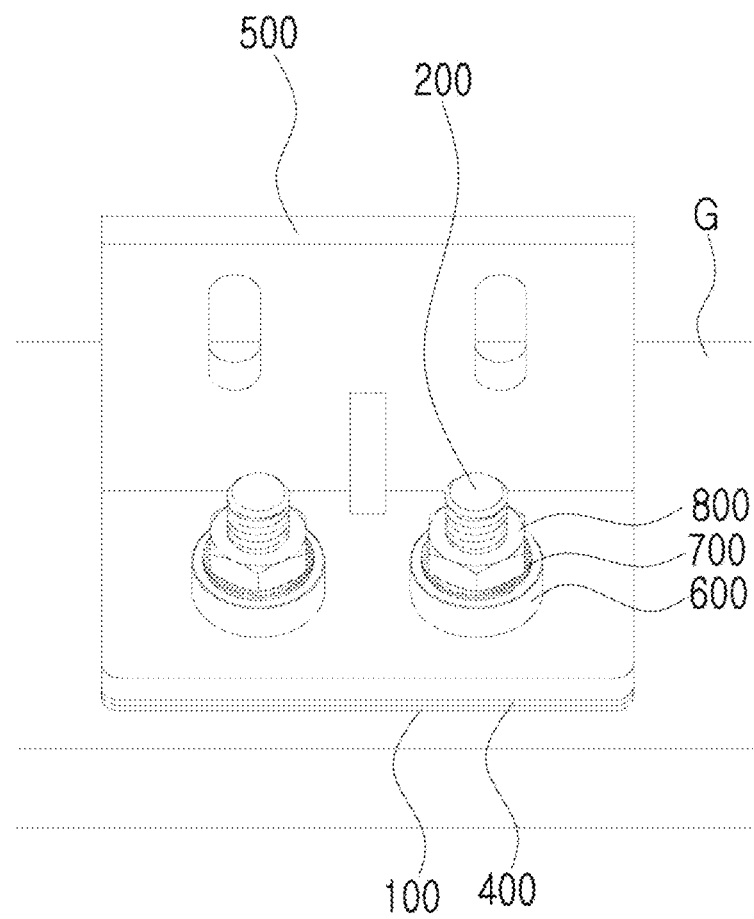

L-SHAPED BOLT FASTENING STRUCTURE USING HOLE GUARD

CLAIM FOR PRIORITY

This application claims priority to Korean Patent Application No. 10-2022-0134880 filed on Oct. 19, 2022 and to Korean Patent Application No. 10-2023-0016573 filed on Feb. 8, 2023 in the Korean Intellectual Property Office (KIPO), the entire contents of which are hereby incorporated by reference.

BACKGROUND

1. Technical Field

Example embodiments of the present disclosure relate to a bolt fastening structure, and more particularly, to an L-shaped bolt fastening structure using a hole guard, which is capable of being installed in holes having various sizes.

2. Related Art

In general, in production facilities, equipment is fixed to and installed on lower structures such as grating plates. Usually, grating plates are installed at a certain height from a ground surface, and pipes, wires, and the like are installed below the grating plates. In this way, a plurality of grating plates are arranged at a certain height to form such a shelf-like shape, and the height reaches a range of about 4 m to 10 m. Production equipment is fixed to and installed on grating plates installed as described above. Equipment is fixed and installed through a typical method of fastening the corresponding equipment and a grating plate using brackets. However, a task of fixing equipment to a grating plate, on which other pieces of equipment are fixedly placed, using brackets without changing a position of the grating plate is difficult. As described above, since a grating plate is installed at a certain level in the form of a shelf, other workers should assist in tightening fasteners such as bolts/nuts under the grating plate every time. Therefore, work under the grating plate is time-consuming and risky for workers.

On the other hand, when a part of a grating plate installed in the form of a shelf is lifted at a production site, serious safety accidents such as a worker falling occur.

In addition, holes of a grating plate to which bolts are fastened may be damaged and have irregular sizes, or the use of fasteners such as bolts/nuts may be impossible due to the damaged holes, which causes a problem that the grating plate itself needs to be replaced.

Meanwhile, in addition to a grating plate in which holes are formed, various types of support plates, such as a grating plate and a flat steel pad in which grid-shaped holes are formed, are used for a floor of a production site. Holes formed in a grating plate or steel pad in which such grid-shaped holes are formed have irregular sizes that are greater than those of holes formed in a grating plate or have a grid shape or long hole shape. Therefore, since it is impossible to mount bolts with a typical size to correspond to various holes, there is a need for a bolt fastening structure capable of being fastened according to a size of each hole.

SUMMARY

Accordingly, example embodiments of the present inventive concept are provided to substantially obviate one or more problems due to limitations and disadvantages of the related art.

Example embodiments of the present inventive concept provide an L-shaped bolt fastening structure using a hole guard, which is capable of quickly and firmly fixing equipment without changing a lower structure such as a grating plate or a steel pad having holes with various sizes.

In some example embodiments, an L-shaped bolt fastening structure includes a lower structure which is positioned below equipment of an industrial facility and in which a hole for fastening is formed, a hole guard inserted into and fixed to the hole of the lower structure, an L-shaped bolt inserted into the hole of the lower structure and including an upper vertical portion on which a thread is formed and a lower horizontal portion formed to extend from a lower end of the upper vertical portion through a bent portion, and a fall prevention washer which has a ring shape, is fastened to the L-shaped bolt, and is supported on an upper surface of the lower structure to prevent the L-shaped bolt from falling below the lower structure.

The hole guard may include a support portion disposed on the lower structure, a hole insertion portion disposed below the support portion and inserted into the hole of the lower structure, and a bolt hole formed to pass through the support portion and the hole insertion portion such that the L-shaped bolt is inserted therethrough.

The hole insertion portion may be provided as two or more hole insertion portions disposed below the support portion.

The hole insertion portion may have the same shape and size as the hole of the lower structure.

The hole insertion portion may have a cylindrical shape having a certain height.

The bolt hole may have a long hole shape such that the lower horizontal portion passes through the hole insertion portion when the lower horizontal portion of the L-shaped bolt is first inserted into the hole guard.

The hole insertion portion may include a first protrusion protruding from one side of a lower surface of the hole insertion portion, and a second protrusion formed to protrude from the lower surface of the hole insertion portion and formed to be spaced apart from the first protrusion.

The first protrusion and the second protrusion may be spaced apart from each other as much as a thickness of the L-shaped bolt such that the lower horizontal portion of the L-shaped bolt is disposed and fixed between the first protrusion and the second protrusion.

The first protrusion may have a height that is greater than a height of the second protrusion.

The hole insertion portion may have a form divided into two portions below the support portion.

The hole insertion portion may include a first protrusion protruding from one side of a lower surface of the hole insertion portion, and a second protrusion formed to protrude from the lower surface of the hole insertion portion and formed to be spaced apart from the first protrusion.

The hole insertion portion may have a ring shape.

The L-shaped bolt further may include a locking groove having a groove shape and a certain angle in a bent inner portion of the bent portion.

The fall prevention portion may include a locking portion which has a ring shape and is supported on an upper surface of the hole guard, and a coupling hole which is formed inside the locking portion and into which the L-shaped bolt is inserted.

The L-shaped bolt may further include an upright auxiliary portion having a shape that protrudes from a bent outer portion of the bent portion.

The fall prevention washer may further include a mounting groove formed in the locking portion such that the locking portion passes through the upright auxiliary portion to be mounted on the upper vertical portion of the L-shaped bolt.

The locking portion may further include a plurality of cut portions formed inside the locking portion.

The fall prevention washer may further include an insertion portion formed below the locking portion and inserted into the hole of the lower structure.

The locking portion may be formed in a zigzag shape, and the fall prevention washer may further include an expansion portion which is formed to extend from the locking portion and allows a size of the coupling hole to be enlarged or reduced through elasticity thereof.

The fall prevention washer may include a ring portion having a ring shape and a coupling hole into which the L-shaped bolt is inserted, a protrusion protruding from one side of the ring portion, and an expansion portion having divided portions formed by being divided from the other side of the ring portion, wherein a distance between the divided portions may be increased by an external force and decreased by elasticity thereof.

BRIEF DESCRIPTION OF DRAWINGS

Example embodiments of the present inventive concept will become more apparent by describing example embodiments of the present inventive concept in detail with reference to the accompanying drawings, in which:

FIGS. 18 to 21 are views illustrating a method of mounting an L-shaped bolt fastening structure using a hole guard according to the present inventive concept.

DESCRIPTION OF EXAMPLE EMBODIMENTS

Figure 1:
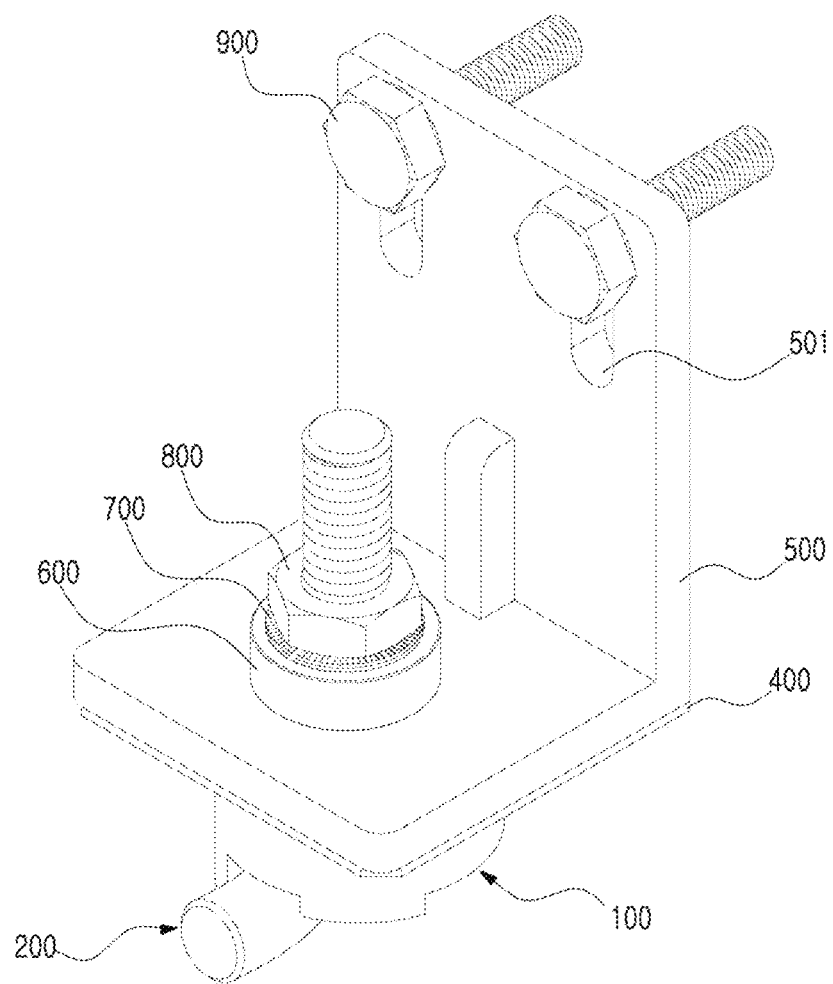
FIG. 1 is a view illustrating an L-shaped bolt fastening structure using a hole guard according to the present inventive concept.

The present inventive concept can be modified into various forms and can have various example embodiments. Specific example embodiments will be shown in the accompanying drawings and described in detail. However, the present inventive concept is not intended to be limited to the specific example embodiments, and it is interpreted that all the modifications, equivalents, and substitutions belonging to the concept and technical scope of the present inventive concept are included in the present inventive concept. In describing the present inventive concept, when it is determined that detailed descriptions of known techniques involved in the present inventive concept may obscure the gist of the present inventive concept, the detailed descriptions thereof will be omitted.

Hereinafter, example embodiments according to the present inventive concept will be described in detail with reference to the accompanying drawings, and in describing the example embodiments with reference to the accompanying drawings, the same or corresponding components are assigned the same reference numerals, and redundant descriptions thereof will be omitted.

FIG. 1 is a view illustrating an L-shaped bolt fastening structure using a hole guard of the present inventive concept.

Figure 2:
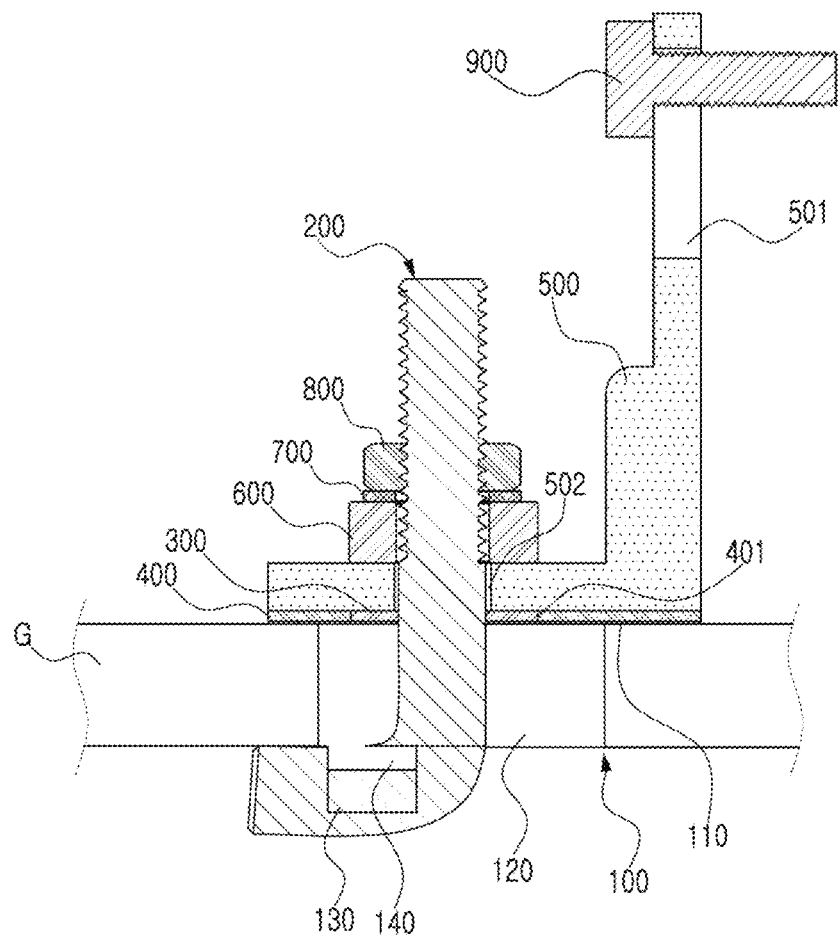
FIG. 2 is a cross-sectional view illustrating the L-shaped bolt fastening structure using the hole guard according to the present inventive concept.

FIG. 2 is a cross-sectional view illustrating the L-shaped bolt fastening structure using the hole guard of the present inventive concept.

Referring to FIGS. 1 and 2, the L-shaped bolt fastening structure using the hole guard of the present inventive concept includes a hole guard 100, an L-shaped bolt 200, a fall prevention washer 300, a buffer pad 400, a bracket 500, an upright auxiliary tool 600, a coupling washer 700, and a fixing nut 800.

First, the hole guard 100 is mounted on a lower structure G in which a hole for fastening to a floor below equipment of an industrial facility is formed. When equipment cannot be mounted using only the L-shaped bolt 200, for example, the hole guard 100 may be mounted on a steel pad S having a large hole or a long hole or a grating in which holes are damaged and have irregular sizes. That is, in typical grating holes, equipment may be fixed to a grating using only the L-shaped bolt 200. In the steel pad S having a large hole or a long hole or the grating in which holes are damaged and have irregular sizes, the hole guard 100 may be first mounted on the lower structure G, and then the L-shaped bolt 200 may be mounted on the mounted hole guard 100.

Figure 3:
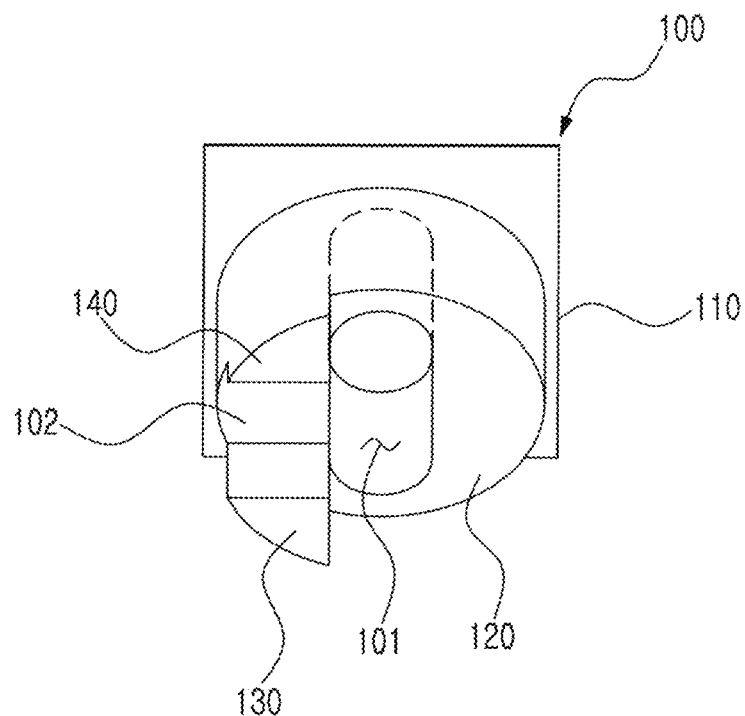
FIG. 3 is a view illustrating a hole guard according to a first example embodiment of the present inventive concept.

FIG. 3 is a view illustrating a hole guard according to a first example embodiment of the present inventive concept.

Figure 4:
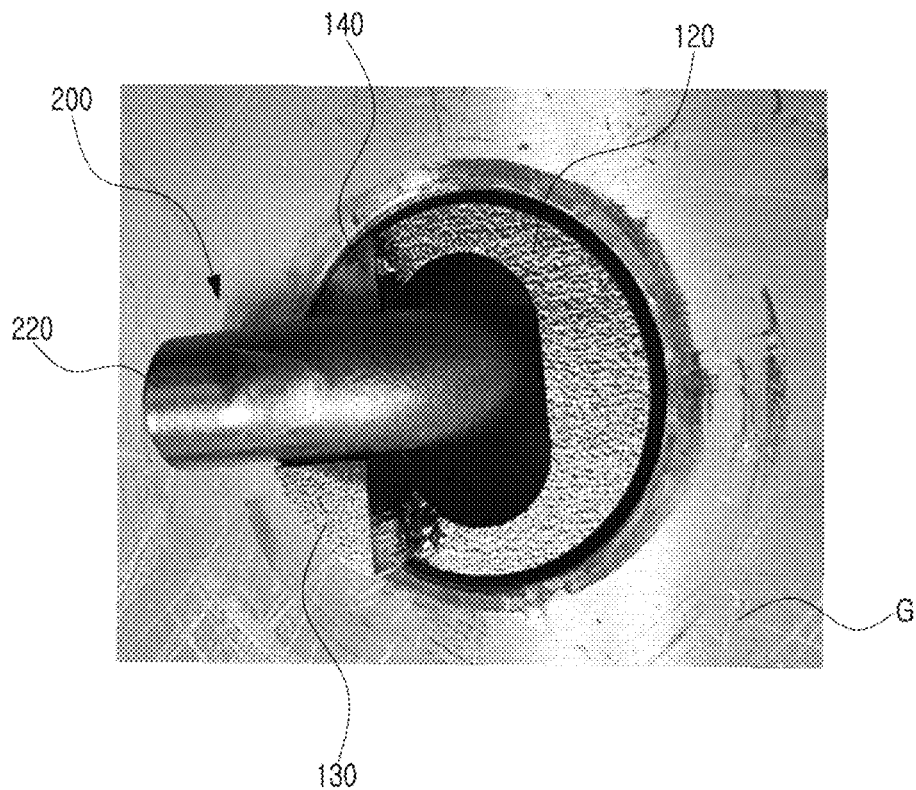
FIG. 4 is an image showing an L-shaped bolt mounted on the hole guard according to the first embodiment of the present inventive concept.

FIG. 4 is an image showing an L-shaped bolt mounted on the hole guard according to the first embodiment of the present inventive concept.

Referring to FIGS. 1 to 4, a hole guard 100 according to the first example embodiment of the present inventive concept may include a support portion 110 having a plate shape and a hole insertion portion 120 disposed below the support portion 110. A bolt hole 101 through which the L-shaped bolt 200 is inserted and mounted may be formed to pass through the support portion 110 and the hole insertion portion 120.

The support portion 110 may have a plate shape, may have a quadrangular or circular shape, and may have a size that is greater than a size of the hole formed in the lower structure G. That is, the support portion 110 may be a portion supported on an upper surface of the lower structure G.

The hole insertion portion 120 may be disposed below the support portion 110 and may be inserted into the hole of the lower structure G. The hole insertion portion 120 may have a cylindrical shape having a certain height. In this case, the hole insertion portion 120 may have the same shape and size as the hole formed in the lower structure G. As an example, when the hole of the lower structure G has a large circular shape, the hole insertion portion 120 may have a circular shape, and when the hole of the lower structure G has an elliptical shape, the hole insertion portion 120 may have an elliptical shape. One or more hole insertion portions 120 may be disposed below the support portion 110 according to equipment fixed on the lower structure G.

When the hole insertion portion 120 is inserted into the hole of the lower structure G, the hole guard 100 can be supported on an upper surface of the lower structure G by the support portion 110, thereby preventing the hole guard 100 from falling below the lower structure G.

In addition, when the hole insertion portion 120 has a cylindrical shape having a certain height, the bolt hole 101 formed in the hole guard 100 preferably has a long hole shape. This is to allow a lower horizontal portion 220 of the L-shaped bolt 200 to pass through the hole insertion portion 120 having the certain height when the L-shaped bolt 200 is inserted into the bolt hole 101 of the hole guard 100. For example, a fastening structure of the L-shaped bolt 200 according to the present inventive concept is mounted such that, when the L-shaped bolt 200 is inserted into the bolt hole 101 of the hole guard 100, the lower horizontal portion 220 of the L-shaped bolt 200 is first inserted. Therefore, due to a bent shape of the L-shaped bolt 200, the L-shaped bolt 200 may pass through the bolt hole 101 without mutual interference only when the bolt hole 101 has a long hole shape.

A first protrusion 130 and a second protrusion 140 may be formed below the hole insertion portion 120. The first protrusion 130 and the second protrusion 140 may protrude from one side of a lower surface of the hole insertion portion 120 and may be spaced a certain interval from each other. In addition, the first protrusion 130 and the second protrusion 140 may have a certain height such that the L-shaped bolt 200 is not rotated when the L-shaped bolt 200 is mounted in the hole insertion portion 120.

As an example, when the L-shaped bolt 200 is fastened using the fixing nut 800, the first protrusion 130 may have a function of preventing the L-shaped bolt 200 from rotating. That is, when the L-shaped bolt 200 is inserted into the hole guard 100, the lower horizontal portion 220 of the L-shaped bolt 200 may be disposed at a position at which the lower horizontal portion 220 is in contact with a side surface of the first protrusion 130. In this case, when the fixing nut 800 is rotated clockwise to fasten an upper vertical portion 210 of the L-shaped bolt 200, the L-shaped bolt 200 may be fixed without being rotated by the first protrusion 130. Therefore, a worker can quickly and stably fix the fixing nut 800 to the L-shaped bolt 200 even above the lower structure G.

The second protrusion 140 may have a function of preventing the fixed L-shaped bolt 200 from being loosened due to vibration or shock. For example, the L-shaped bolt 200 fixed to the hole guard 100 may be loosened when vibration or shock generated from equipment is transmitted to the lower structure G. However, the L-shaped bolt 200 according to the present inventive concept can be prevented from being rotated by the second protrusion 140, thereby preventing the L-shaped bolt 200 from being loosened due to vibration or shock. For example, since the lower horizontal portion 220 can be fixed by the second protrusion 140 even when the fixing nut 800 is disassembled, a worker can quickly and stably disassemble the fixing nut 800 above the lower structure G without separately fixing the L-shaped bolt 200.

In addition, the second protrusion 140 may be formed to be spaced apart from the first protrusion 130, and an interval between the first protrusion 130 and the second protrusion 140 may be an interval corresponding to a thickness of the L-shaped bolt 200. For example, a portion between the first protrusion 130 and the second protrusion 140 may be a seating portion 102 on which the L-shaped bolt 200 is fixedly seated. Therefore, it is preferable that a distance between the first protrusion 130 and the second protrusion 140 be a distance enabling the L-shaped bolt 200 to be fixedly seated.

In this case, the second protrusion 140 may have a height that is lower than that of the first protrusion 130. This is to minimize interference between the L-shaped bolt 200 and the second protrusion 140 when the L-shaped bolt 200 is inserted into the hole guard 100 and positioned on the seating portion 102. Therefore, when the L-shaped bolt 200 is rotated toward the first protrusion 130 to be seated on the seating portion 102, the L-shaped bolt 200 may pass through the second protrusion 140 to be quickly seated on the seating portion 102.

Figure 5:
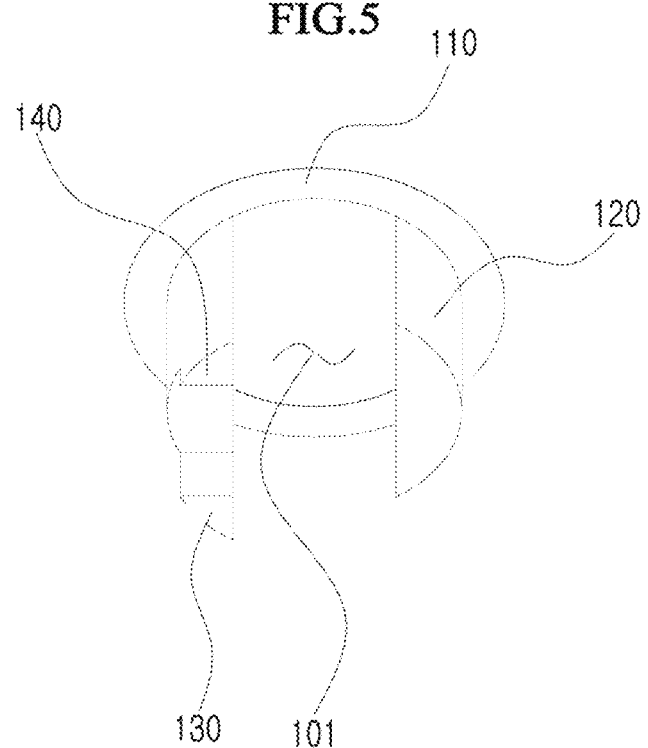
FIG. 5 is a view illustrating a hole guard according to a second example embodiment of the present inventive concept.

FIG. 5 is a view illustrating a hole guard according to a second example embodiment of the present inventive concept.

Referring to FIG. 5, a hole guard 100 according to the second example embodiment of the present inventive concept may include a support portion 110 having a plate shape and a hole insertion portion 120 disposed below the support portion 110. In addition, a bolt hole 101 through which the L-shaped bolt 200 is inserted and mounted may be formed to pass through the support portion 110 and the hole insertion portion 120.

However, in the hole guard 100 according to the second example embodiment, the bolt hole 101 may have a size that is greater than that of the bolt hole 101 of the first example embodiment, and the hole insertion portion 120 may have a form divided into two portions below the support portion 110. As an example, the hole insertion portion 120 may have a certain height as in the first example embodiment and may have a form divided into two portions.

The hole guard 100 according to the second example embodiment may be applied at the time of using an L-shaped bolt 200 having a size that is greater than that of the L-shaped bolt 200 used in the first example embodiment. That is, in the hole guard 100 according to the present inventive concept, a size of the hole insertion portion 120 and a size of the bolt hole 101 can be variously applied according to a size of the hole of the lower structure G and a size of the L-shaped bolt 200. In addition, the hole guards 100 according to the first and second example embodiments may be applied to the lower structure G having a certain thickness and a large hole or a large long hole.

Figure 6:
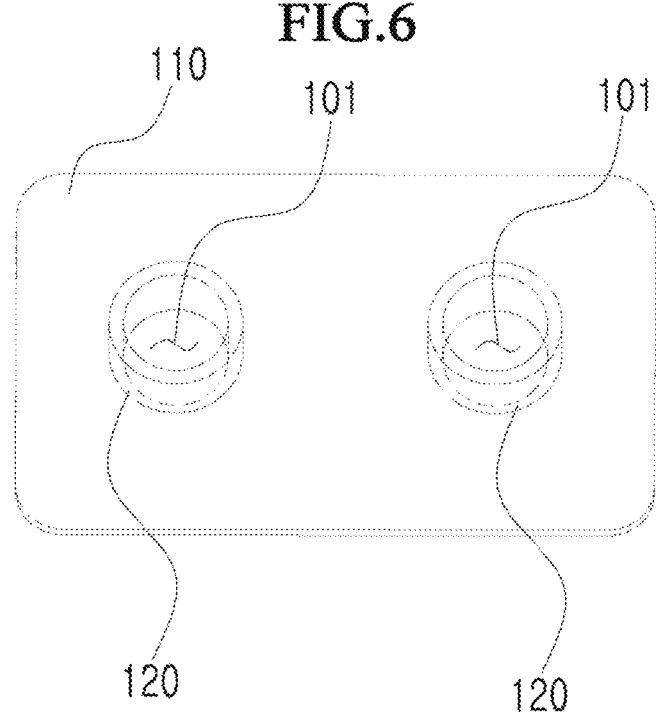
FIG. 6 is a view illustrating a hole guard according to a third example embodiment of the present inventive concept.

FIG. 6 is a view illustrating a hole guard according to a third example embodiment of the present inventive concept.

Figure 7:
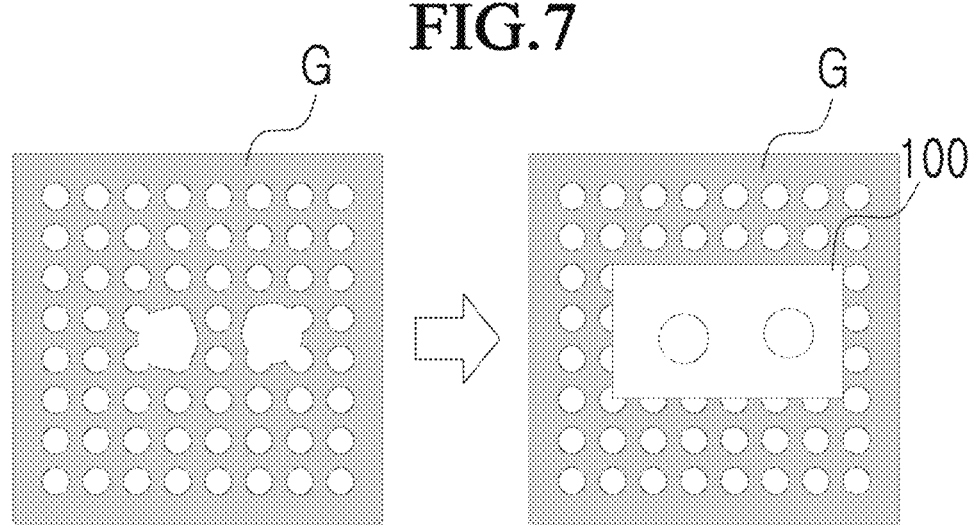
FIG. 7 is a view illustrating an example in which the hole guard is mounted according to the third example embodiment of the present inventive concept.

FIG. 7 is a view illustrating an example in which the hole guard is mounted according to the third example embodiment of the present inventive concept.

Figure 8:
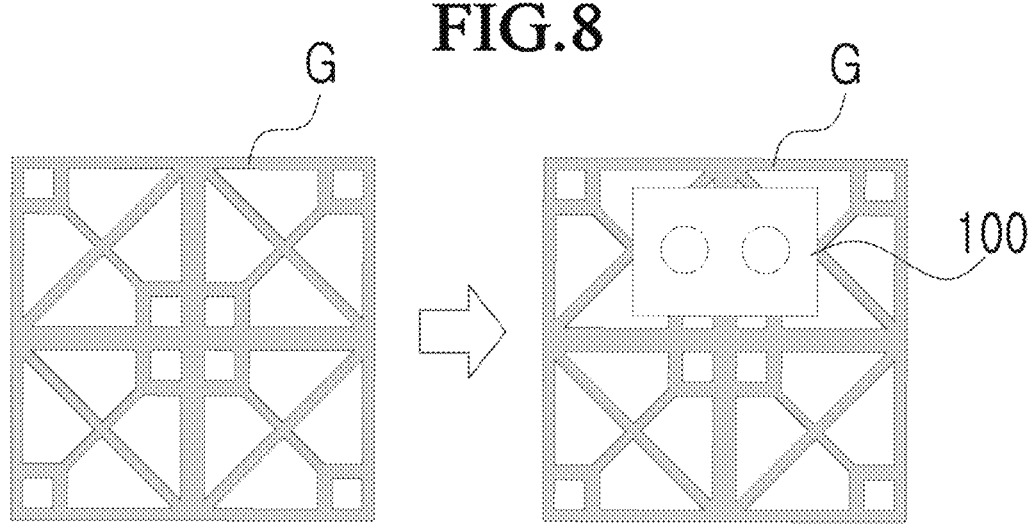
FIG. 8 is a view illustrating another example in which the hole guard is mounted according to the third example embodiment of the present inventive concept.

FIG. 8 is a view illustrating another example in which the hole guard is mounted according to the third example embodiment of the present inventive concept.

Referring to FIGS. 6 to 8, a hole guard 100 according to the third example embodiment of the present inventive concept may include a support portion 110 having a plate shape and a hole insertion portion 120 disposed below the support portion 110. In addition, a bolt hole 101 through which the L-shaped bolt 200 is inserted and mounted may be formed to pass through the support portion 110 and the hole insertion portion 120.

However, the bolt hole 101 of the hole guard 100 according to the third example embodiment may have a circular shape as shown in FIG. 6, and the hole insertion portion 120 may have a ring shape. As an example, as shown in FIG. 7, the hole guard 100 according to the third example embodiment may be mounted on a portion at which holes of a grating plate G are damaged. In addition, as shown in FIG. 8, the hole guard 100 according to the third example embodiment may be mounted on the grating plate G in which holes are formed in a grid shape. That is, the hole guard 100 according to the third example embodiment may be used for reinforcement for mounting the L-shaped bolt 200 on the grating plate G in which holes are damaged or the grating plate G in which holes are formed in a grid shape.

As described above, in the L-shaped bolt fastening structure according to the present inventive concept, by using the hole guard 100 on the lower structure G such as a steel pad having a large hole or a large long hole or a grating in which holes are damaged and have irregular sizes, the L-shaped bolt 200 can be safely and conveniently mounted on the lower structure G.

Next, referring to FIGS. 1 and 2, when the hole guard 100 is mounted on the lower structure G, the L-shaped bolt 200 may be fastened to the mounted hole guard 100.

Figure 9:
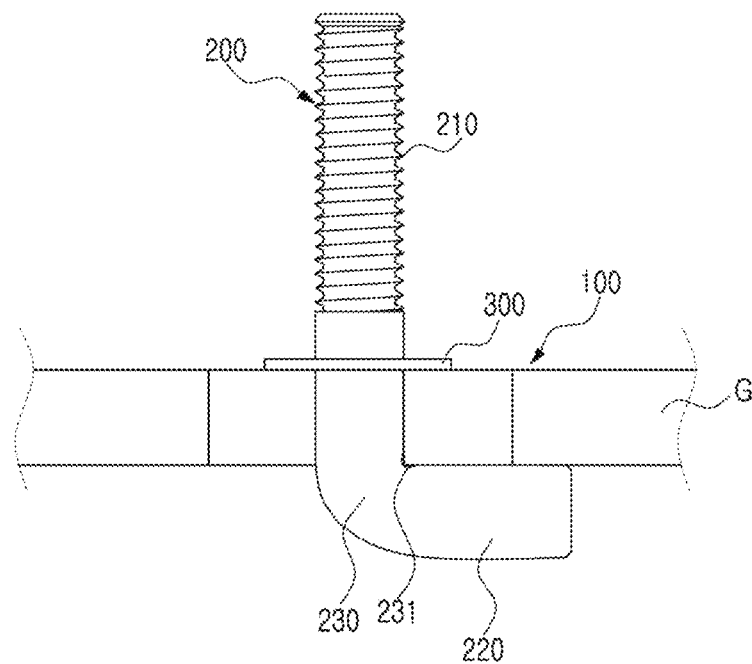
FIG. 9 is a view illustrating an L-shaped bolt according to an example embodiment of the present inventive concept.

FIG. 9 is a view illustrating an L-shaped bolt according to an example embodiment of the present inventive concept.

Referring to FIGS. 1, 2, and 9, an L-shaped bolt 200 according to the present inventive concept has an "L" shape and includes an upper vertical portion 210, a lower horizontal portion 220, and a bent portion 230. The lower horizontal portion 220 may have a shape extending downward from the upper vertical portion 210 through the bent portion 230.

The lower horizontal portion 220 may be a portion which, when coupled, is inserted into a bolt hole 101 of the hole guard 100 and is positioned below the lower structure G and pressed against a lower surface of the hole guard 100. The upper vertical portion 210 is a portion which passes through fastening holes formed in the lower structure G and the bracket 500 and fastening elements which are placed thereon. The upper vertical portion 210 has a screw groove formed therein, and the fixing nut 800 is coupled thereto.

In addition, a locking groove 231 having a groove shape with a certain angle may be formed in a bent inner portion of the bent portion 230. As an example, the locking groove 231 may be formed to have a groove shape toward the inside of the bent portion 230 and have a certain angle in an inward direction.

When the L-shaped bolt 200 is inserted into the hole guard 100 and fastened with the fixing nut 800, due to the locking groove 231, the L-shaped bolt 200 may be fixed in an upright state. As an example, when the inside of the bent portion 230 has a curved shape, due to an inner curved portion, the L-shaped bolt 200 cannot be in close contact with a side surface of the bolt hole 101 of the hole guard 100. Therefore, when the L-shaped bolt 200 is fastened, the L-shaped bolt 200 may be fastened to be inclined as much as an angle of the curved shape or cannot be firmly fastened. However, since the L-shaped bolt 200 according to the present inventive concept includes the locking groove 131 having a certain angle in an inner portion of the bent portion 230, when the L-shaped bolt 200 is fastened to the hole guard 100, the locking groove 231 may be fastened in close contact with the side surface of the bolt hole 101. Accordingly, the fixing nut 800 can be easily and quickly coupled, and also a correct coupling posture can be implemented even after the fixing nut 800 is completely tightened. This is applicable not only when the L-shaped bolt 200 is mounted on the hole guard 100 but also when the L-shaped bolt 200 is coupled to the lower structure G.

Figure 10:
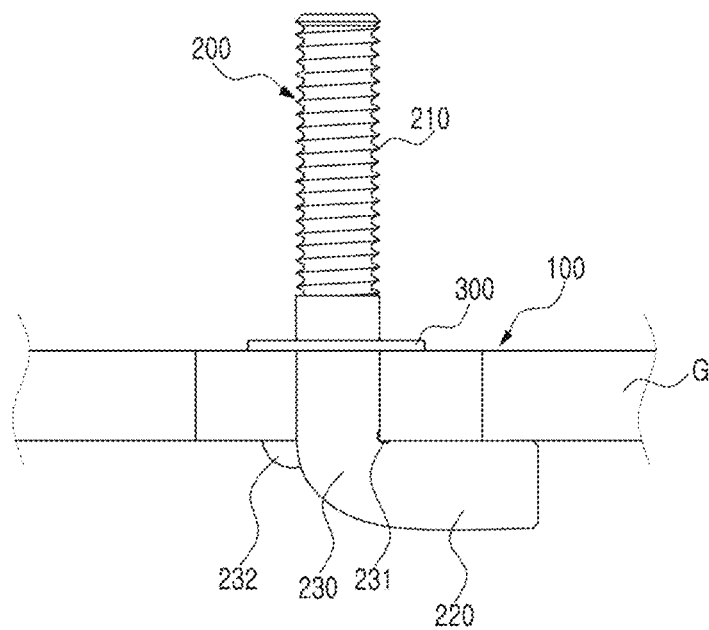
FIG. 10 is a view illustrating an L-shaped bolt according to another example embodiment of the present inventive concept.

FIG. 10 is a view illustrating an L-shaped bolt according to another example embodiment of the present inventive concept.

Referring to FIGS. 1, 2, and 10, in the L-shaped bolt according to another example embodiment of the present inventive concept, a bent portion 230 of an L-shaped bolt 200 may include an upright auxiliary portion 232.

The upright auxiliary portion 232 may be formed on an outer curved surface of the L-shaped bolt 200. That is, the upright auxiliary portion 232 may have a shape protruding from a bent outer portion of the bent portion 230 of the L-shaped bolt 200. In this case, it is preferable that an upper surface of the upright auxiliary portion 232 be positioned to be coplanar with an upper surface of a lower horizontal portion 220. That is, each of the upper surface of the upright auxiliary portion 232 and the upper surface of the lower horizontal portion 220 is disposed in contact with a lower surface of the hole guard 100, thereby allowing the L-shaped bolt 200 to be upright.

However, since a length of the lower horizontal portion of the L-shaped bolt 200 is increased due to lengths of the lower horizontal portion 220 and the upright auxiliary portion 232, the upright auxiliary portion 232 is applicable to the hole guard 100 having a long hole or the lower structure G having a large hole through which the upright auxiliary portion 232 can pass.

As described above, together with a locking groove 231, the upright auxiliary portion 232 may function to allow the L-shaped bolt 200 to be fastened upright. That is, the locking groove 231 is in close contact with a bolt hole 101 of the hole guard 100, and the upright auxiliary portion 232 is in close contact with the lower surface of the hole guard 100, thereby allowing the L-shaped bolt 200 to be fixed in an upright state. Therefore, since the fixing nut 800 may be fastened in a state in which the L-shaped bolt 200 is upright, the fixing nut 800 can be quickly coupled and can be fastened and fixed in an upright state.

Next, referring to FIGS. 1 and 2, the fall prevention washer 300 may be inserted into the L-shaped bolt 200 and mounted on an upper vertical portion 210. That is, the L-shaped bolt 200 may be fitted into a bolt hole 101 of the hole guard 100 in a state in which the fall prevention washer 300 is mounted, and the fall prevention washer 300 may be disposed to be supported on an upper surface of the hole guard 100, thereby preventing the L-shaped bolt 200 from falling below the lower structure G.

Figure 11:
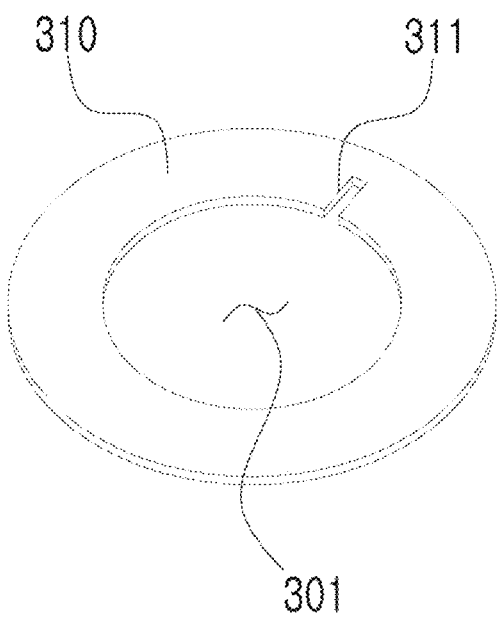
FIG. 11 is a view illustrating a fall prevention washer according to a first example embodiment of the present inventive concept.

FIG. 11 is a view illustrating a fall prevention washer according to a first example embodiment of the present inventive concept.

Referring to FIG. 11, a fall prevention washer 300 according to the first example embodiment of the present inventive concept may include a locking portion 310 having a ring shape with a coupling hole 301 and a mounting groove 311 formed inside the locking portion 310. Here, the coupling hole 301 may be a hole into which the L-shaped bolt 200 is inserted, and the locking portion 310 may be a portion supported on an upper surface of the hole guard 100. In addition, the mounting groove 311 may be a groove for fastening the fall prevention washer 300 to the L-shaped bolt 200 including an upright auxiliary portion 232.

As an example, a diameter of the coupling hole 301 of the fall prevention washer 300 should be less than or equal to a diameter of an upper vertical portion 210 of the L-shaped bolt 200. This is to fix the fall prevention washer 300 to the L-shaped bolt 200 after the L-shaped bolt 200 is inserted into the fall prevention washer 300.

In this case, since, in the upper vertical portion 210 of the L-shaped bolt 200, a portion on which a thread is formed has a larger diameter than a portion on which a thread is not formed, in order to fasten the fall prevention washer 300 to the L-shaped bolt 200, the fall prevention washer 300 should be inserted onto a lower horizontal portion 220 of the L-shaped bolt 200 and moved up to a position of the upper vertical portion 210.

As an example, in order to fasten the fall prevention washer 300 to the L-shaped bolt 200 including the upright auxiliary portion 232 shown in FIG. 10, the fall prevention washer 300 according to the first example embodiment may be used. That is, since the locking portion 310 of the fall prevention washer 300 includes the mounting groove 311, due to the mounting groove 311, the fall prevention washer 300 may pass through the upright auxiliary portion 232 to move to the upper vertical portion 210.

Figure 12:
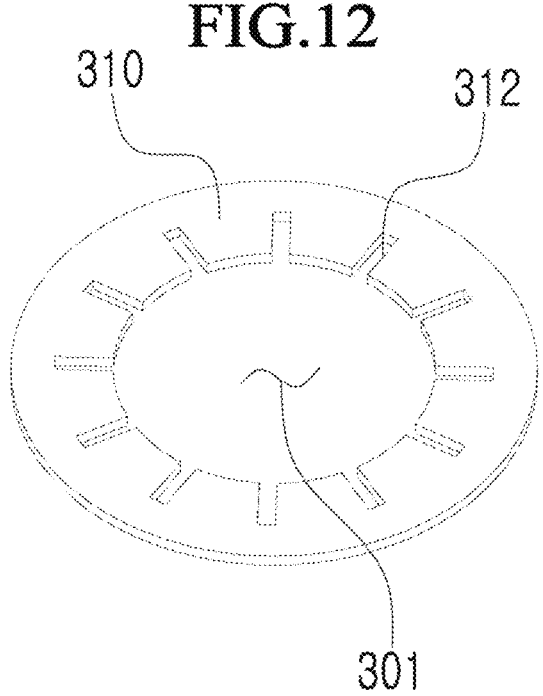
FIG. 12 is a view illustrating a fall prevention washer according to a second example embodiment of the present inventive concept.

FIG. 12 is a view illustrating a fall prevention washer according to a second example embodiment of the present inventive concept.

Referring to FIG. 12, a fall prevention washer 300 according to the second example embodiment of the present inventive concept may include a locking portion 310 having a ring shape with a coupling hole 301 and a plurality of cut portions 312 inside the locking portion 310. In this case, a diameter of the coupling hole 301 of the fall prevention washer 300 may be less than a diameter of the L-shaped bolt 200. As an example, when a lower horizontal portion 220 of the L-shaped bolt 200 is moved to an upper vertical portion 210 to fasten the fall prevention washer 300 to the L-shaped bolt 200, while the cut portions 312 are spread, the fall prevention washer 300 having a diameter that is less than the diameter of the L-shaped bolt 200 may be fastened to the L-shaped bolt 200. Therefore, when the fall prevention washer 300 is positioned on the upper vertical portion 210, the fall prevention washer 300 can be stably fixed to the L-shaped bolt 200 by the cut portion 312.

Figure 13:
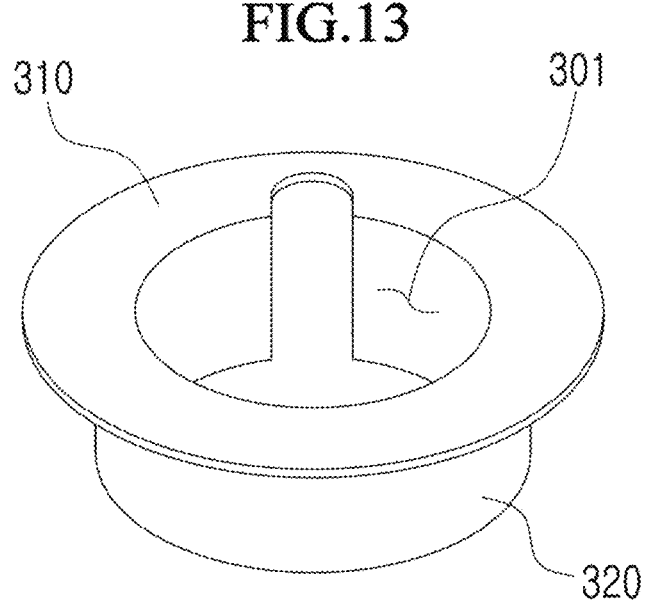
FIGS. 13 and 14 are views illustrating a fall prevention washer according to a third example embodiment of the present inventive concept.
Figure 14:
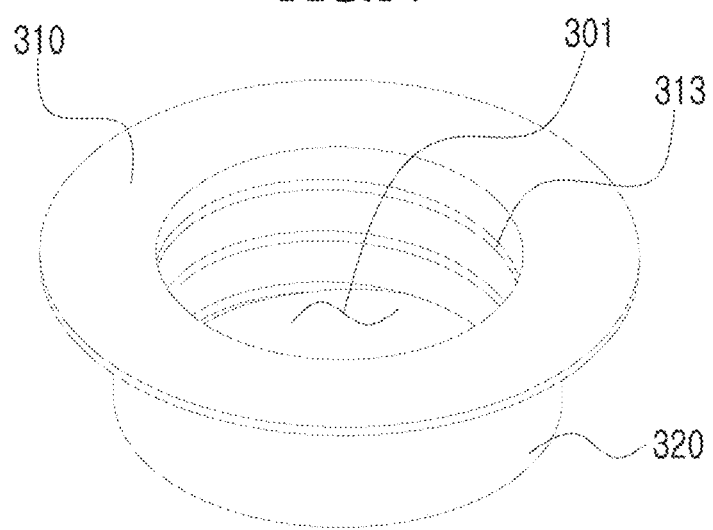

FIGS. 13 and 14 are views illustrating a fall prevention washer according to a third example embodiment of the present inventive concept.

Referring to FIGS. 13 and 14, a fall prevention washer 300 according to the third example embodiment of the present inventive concept may include a locking portion 310 having a ring shape with a coupling hole 301 and an insertion portion 320 formed below the locking portion 310. As an example, when the L-shaped bolt 200 to which the fall prevention washer 300 is fastened is mounted on the hole guard 100, the insertion portion 320 of the fall prevention washer 300 may be inserted into a bolt hole 101 of the hole guard 10. More specifically, the locking portion 310 of the fall prevention washer 300 is supported on an upper surface of the hole guard 100, and the insertion portion 320 is inserted into the bolt hole 101 of the hole guard 100, thereby preventing the L-shaped bolt 200 from shaking due to a clearance in the bolt hole 101. That is, the L-shaped bolt 200 can be fixed upright in the bolt hole 101. Therefore, a worker can quickly and firmly perform a task when mounting or disassembling a bolt fastening structure to the lower structure G.

In addition, as shown in FIG. 14, a tap 313 to be fastened to a thread of the L-shaped bolt 200 may be formed on a side surface of the fall prevention washer 300 in which the coupling hole 301 is formed. That is, the tap 313 may be formed to extend from the inside of the locking portion 310 to the inside of the insertion portion 320.

When the tap 313 is formed in the coupling hole 301, the fall prevention washer 300 may be inserted onto and fastened to an upper vertical portion 210 in which the thread of the L-shaped bolt 200 is formed. The fall prevention washer 300 fastened to the thread of the L-shaped bolt 200 using the tap 313 is preferably formed of a metal material. Therefore, the fall prevention washer 300 can be easily fastened to the L-shaped bolt 200, and the L-shaped bolt 200 can stay upright due to the insertion portion 320 inserted into the bolt hole 101 of the hole guard 100. In addition, the insertion portion 320 inserted into the bolt hole 101 of the hole guard 100 may function as a barrier for surrounding and protecting the inside of the bolt hole 101, thereby obtaining an effect of preventing the bolt hole 101 from being damaged by movement of the L-shaped bolt 200.

Figure 15:
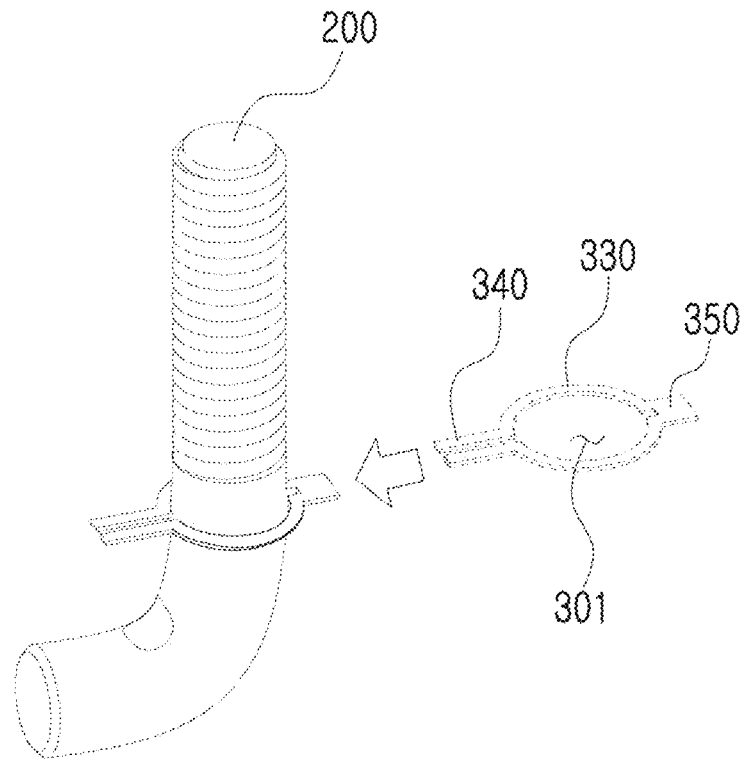
FIG. 15 is a view illustrating a fall prevention washer according to a fourth example embodiment of the present inventive concept.

FIG. 15 is a view illustrating a fall prevention washer according to a fourth example embodiment of the present inventive concept.

Figure 16:
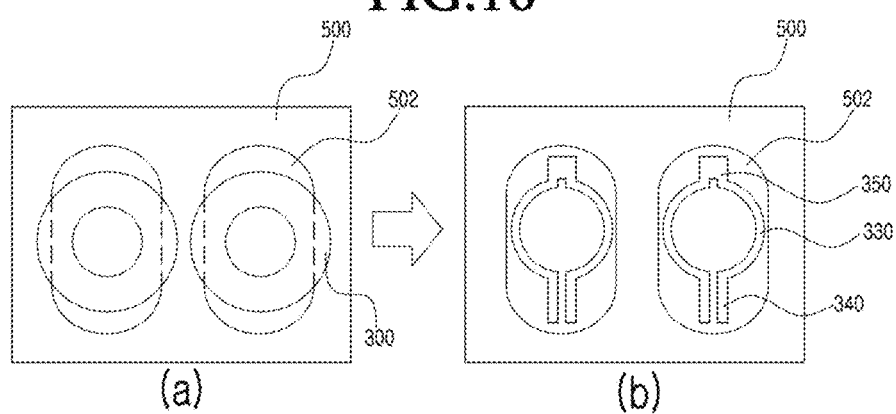
FIG. 16 shows views illustrating a use example of the fall prevention washer according to the fourth example embodiment of the present inventive concept.

FIG. 16 shows views illustrating a use example of a fall prevention washer 300 according to the fourth example embodiment of the present inventive concept.

Referring to FIGS. 15 and 16, the fall prevention washer 300 according to the fourth example embodiment of the present inventive concept may include a ring portion 330 having a ring shape with a coupling hole 301 and an expansion portion 340 and a protrusion 350 formed at both sides of the ring portion 330.

The expansion portion 340 and the protrusion 350 are formed to extend from the ring portion 330 and may be formed to protrude from both sides of the ring portion 330. In this case, the expansion portion 340 may have a form divided into two portions. As an example, a distance between the divided portions of the expansion portion 340 may be increased or decreased by a certain force. That is, the distance between the divided portions of the expansion portion 340 may be increased by an externally applied force and may be decreased again by elasticity when the force is removed. In addition, when the distance between the divided portions of the expansion portion 340 connected to the ring portion 330 is increased, the coupling hole 301 of the ring portion 330 may also expand, and the distance between the divided portions of the expansion portion 340 may be decreased so that the coupling hole 301 may also contract.

Therefore, when the fall prevention washer 300 according to the fourth example embodiment is fastened to the L-shaped bolt 200, as shown in FIG. 15, the fall prevention washer 300 may be fastened directly to an upper vertical portion 210 of the L-shaped bolt 200 using elasticity of the expansion portion 340.

In addition, as shown in FIG. 16A, when a hole 402 formed in the bracket 500 has a long hole shape, a clearance may be generated between the bracket 500 and the lower structure G by interference between the bracket 500 and the fall prevention washer 300 having a ring shape. However, as shown in FIG. 16B, the fall prevention washer 300 according to the fourth example embodiment of the present inventive concept may be disposed in a long hole without interference with the bracket 500 in which the long hole is formed. That is, the fall prevention washer 300 may be fixed to the L-shaped bolt 200 by the ring portion 330 and may be supported on an upper surface of the hole guard 100 by the expansion portion 340 and the protrusion 350. Therefore, the fall prevention washer 300 may be easily installed and dissembled and may also be used for the bracket 500 having the long hole.

Figure 17:
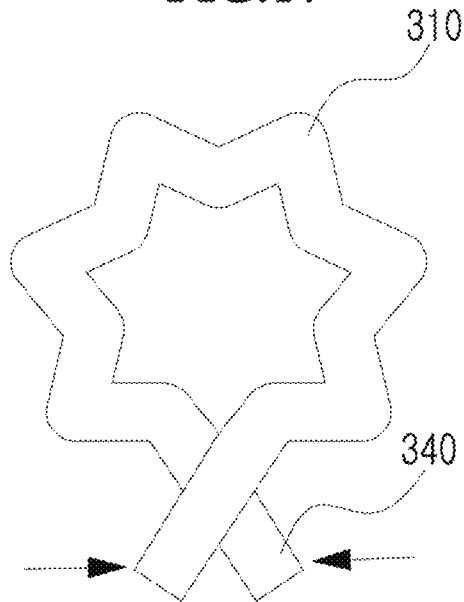
FIG. 17 is a view illustrating a fall prevention washer according to a fifth example embodiment of the present inventive concept.

FIG. 17 is a view illustrating a fall prevention washer according to a fifth example embodiment of the present inventive concept.

Referring to FIG. 17, a fall prevention washer 300 according to the fifth example embodiment of the present inventive concept may include a locking portion 310 having a ring shape with a coupling hole 301 and an expansion portion 340 formed at one side of the locking portion 310.

In this case, the locking portion 310 may have a zigzag ring shape. Due to such a zigzag shape, a plurality of protrusions may be formed inside the locking portion 310. The protrusions may function to more firmly fix the fall prevention washer 300 to the L-shaped bolt 200.

In addition, the expansion portion 340 may be formed to extend from the locking portion 310 and to protrude to one side and may be divided into two portions. However, the expansion portion 340 according to the fifth example embodiment may be disposed such that the divided portions intersect each other. That is, when an external force is applied to the intersecting portions of the expansion portion 340, a size of the coupling hole 301 may also be enlarged or reduced through elasticity of the expansion portion 340. Therefore, the fall prevention washer 300 according to the fifth example embodiment may be fastened and fixed to the L-shaped bolt 200 in the form of a clip.

As an example, when the size of the coupling hole 301 is enlarged by applying an external force to the expansion portion 340, the L-shaped bolt 200 is inserted, and when the insertion of the L-shaped bolt 200 is completed, the external force applied to the expansion portion 340 is removed to reduce the size of the coupling hole 301, thereby fixing the fall prevention washer 300 to the L-shaped bolt 200. In this case, the fall prevention washer 300 may be more firmly fixed to the L-shaped bolt 200 due to the zigzag shape of the locking portion 310.

As described above, according to the L-shaped bolt fastening structure according to the present inventive concept, when the L-shaped bolt 200 is mounted on or disassembled from the hole guard 100 or the lower structure G using the fall prevention washers 300 according to the first to fifth example embodiments, it is possible to prevent the L-shaped bolt 200 from falling below the lower structure G.

Next, referring to FIGS. 1 and 2, as can be seen in the drawings, the bracket 500 may have an "L" shape, but the present inventive concept is not limited thereto. Various other shapes in which one side portion may be coupled to equipment and the other side portion may be coupled to a support portion may be applied.

One or more first coupling holes 501 to be coupled to the equipment are formed in one side of the bracket 500, and a second coupling hole 502 is formed in the other side.

Through the first long hole 501 of the bracket 500, a coupling bolt 900 is fastened to a screw hole (not shown) of the equipment, and the L-shaped bolt 200 is inserted into the second coupling hole 502. Accordingly, the bracket 500 may be disposed on the fall prevention washer 300.

In this case, the buffer pad 400 having a washer hole 401 may be included between the bracket 500 and the lower structure G. The buffer pad 400 may be disposed on the lower structure G such that the fall prevention washer 300 is inserted into the washer hole 401. Therefore, the buffer pad 400 can prevent vibration introduced from the lower structure G from being transmitted upward, and the fall prevention washer 300 can prevent the bracket 500 from structurally floating.

The upright auxiliary tool 600, the coupling washer 700, and the fixing nut 800 may be disposed on the bracket 500.

When the L-shaped bolt 200 is fastened using the fixing nut 800, the upright auxiliary tool 600 prevents the L-shaped bolt 200 from tilting and allows the L-shaped bolt 200 to be fastened in an upright state. Therefore, the upright auxiliary tool 600 may have a hole into which a body of the L-shaped bolt 200 is inserted and may have a certain height such that the L-shaped bolt 200 is upright and maintains a straight posture.

The coupling washer 700 is disposed on the upright auxiliary tool 600, and the fixing nut 800 is fastened on the coupling washer 700. A protrusion may be formed on a surface of the coupling washer 700 to prevent the fixing nut 800 from being loosened by vibration or external shock after the fixing nut 800 is fixed.

FIGS. 18 to 21 are views illustrating a method of mounting an L-shaped bolt fastening structure using a hole guard according to the present inventive concept.

Figure 18:
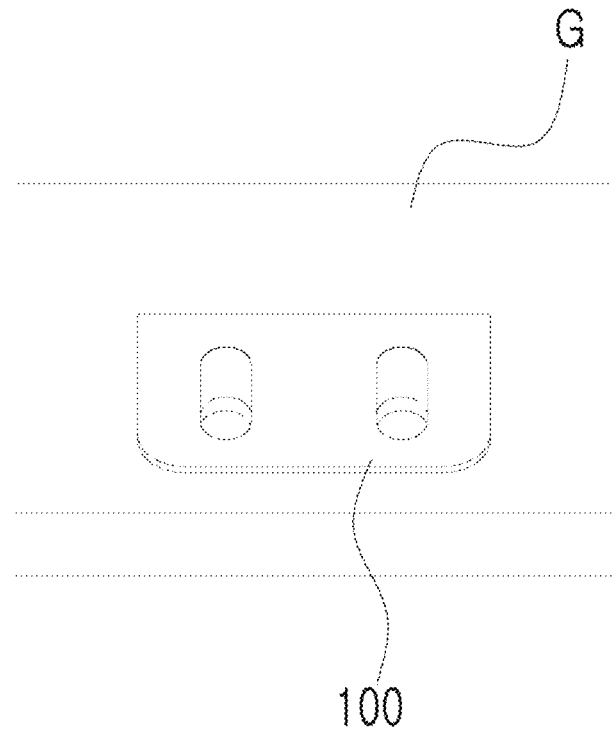
Figure 19:
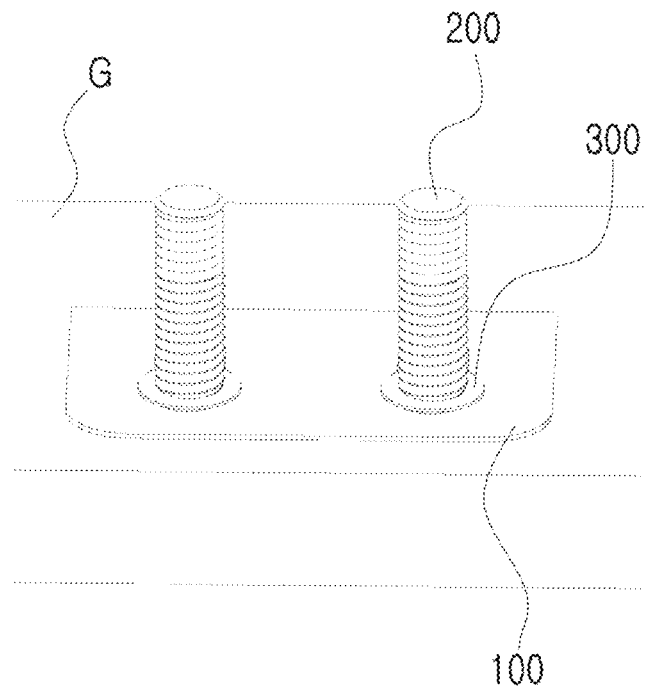

First, referring to FIG. 18, a hole guard 100 is mounted on a lower structure G such as a steel pad having a large hole or a large long hole. In this case, a hole guard 100 in which a hole insertion portion 120 of the hole guard 100 has the same size and shape as a hole of the lower structure G may be selected. According to equipment fixed on the lower structure G, one or more hole guards 100 may be disposed below a support portion 110.

Referring to FIG. 9, the L-shaped bolt 200 on which a fall prevention washer 300 is mounted is fastened to the lower structure G. The L-shaped bolt 200 may be fastened by inserting a lower horizontal portion 220 into the hole guard 100 from above the lower structure G. In this case, the L-shaped bolt 200 is fixed by the fall prevention washer 300, thereby preventing the L-shaped bolt 200 from falling below the lower structure G.

Figure 20:
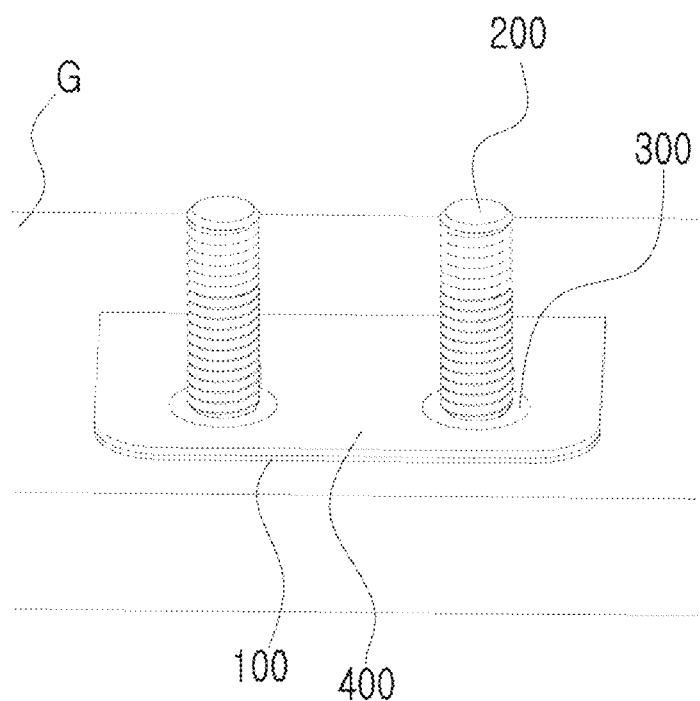

Referring to FIG. 20, a buffer pad 400 is mounted on the hole guard 100. The buffer pad 400 may be disposed to cover the entirety of an upper surface of the hole guard 100, and the L-shaped bolt 200 and the fall prevention washer 300 may be exposed to the outside by a hole formed in the buffer pad 400. The buffer pad 400 is preferably formed of, for example, an elastic rubber material.

Referring to FIG. 21, a bracket 500 is disposed on the buffer pad 400. In addition, an upright auxiliary tool 600, a coupling washer 700, and a fixing nut 800 may be sequentially fastened to the L-shaped bolt 200 exposed at the bracket 500. In this case, while being held upright by the upright auxiliary tool 600, the L-shaped bolt 200 may be fastened by the fixing nut 800.

As described above, in the L-shaped bolt fastening structure using the hole guard according to the present inventive concept, since the L-shaped bolt 200 is fastened in a state in which the hole guard 100 is mounted on the lower structure G, fastening using the L-shaped bolt 200 is applicable to a steel pad S having a large hole or a large long hole or a grating in which holes are damaged and have irregular sizes.

In addition, a protrusion 350 is provided on a lower surface of the hole guard 100, thereby preventing the L-shaped bolt 200 from rotating when the L-shaped bolt 200 is mounted. A locking groove 231 or an upright auxiliary portion 232 is provided at a bent portion of the L-shaped bolt 200, thereby fastening the fixing nut 800 while the L-shaped bolt 200 is held upright.

Furthermore, since bolts can be installed in holes having various sizes in one direction using the hole guard 100 and the L-shaped bolt 200, the L-shaped bolt fastening structure using the hole guard has a wide range of applications in a floor in an industrial site and as a hook hanger or the like of an H-beam structure, a ceiling, or a wall structure of a construction site.

According to the present inventive concept, since an L-shaped bolt is fastened in a state in which a hole guard is mounted on a lower structure, fastening using the L-shaped bolt is applicable to a steel pad having a large hole or a large long hole or a grating in which holes are damaged and have irregular sizes.

In addition, a protrusion is provided on a lower surface of a hole guard, thereby preventing an L-shaped bolt from rotating when the L-shaped bolt is mounted. A locking groove or an upright auxiliary portion is provided at a bent portion of the L-shaped bolt, thereby fastening a fixing nut while the L-shaped bolt is held upright.

Furthermore, since bolts can be installed in holes having various sizes in one direction using a hole guard and an L-shaped bolt, an L-shaped bolt fastening structure using the hole guard has a wide range of applications in a floor in an industrial site and as a hook hanger or the like of an H-beam structure, a ceiling, or a wall structure of a construction site.

Effects of the present inventive concept are not limited to the above-described effects and other effects which are not described may be clearly understood by those skilled in the art from the above description.

Meanwhile, example embodiments of the present inventive concept shown in the present specification and drawings are for enhancing understanding and are not intended to limit the scope of the present inventive concept. It is clear to a person with ordinary knowledge in the art to which the present inventive concept belongs that other modified example embodiments based on the technical concepts of the present inventive concept are possible in addition to the disclosed example embodiments.

What is claimed is:

1. An L-shaped bolt fastening structure comprising:
    a lower structure which is positioned below equipment of an industrial facility and in which a hole for fastening is formed;
    a hole guard inserted into and fixed to the hole of the lower structure;
    an L-shaped bolt inserted into the hole of the lower structure and including an upper vertical portion on which a thread is formed and a lower horizontal portion formed to extend from a lower end of the upper vertical portion through a bent portion; and
    a fall prevention washer which has a ring shape, is fastened to the L-shaped bolt, and is supported on an upper surface of the lower structure to prevent the L-shaped bolt from falling below the lower structure, wherein the hole guard includes:
    a support portion disposed on the lower structure;
    a hole insertion portion disposed below the support portion and inserted into the hole of the lower structure; and
    a bolt hole formed to pass through the support portion and the hole insertion portion such that the L-shaped bolt is inserted therethrough,
    wherein the hole insertion portion has the same shape and size as the hole of the lower structure.

2. The L-shaped bolt fastening structure of claim 1, wherein the hole insertion portion is provided as two or more hole insertion portions disposed below the support portion.

3. The L-shaped bolt fastening structure of claim 1, wherein the hole insertion portion has a cylindrical shape having a certain height.

4. The L-shaped bolt fastening structure of claim 3, wherein the bolt hole has a long hole shape such that the lower horizontal portion passes through the hole insertion portion when the lower horizontal portion of the L-shaped bolt is first inserted into the hole guard.

5. The L-shaped bolt fastening structure of claim 4, wherein the hole insertion portion includes:
    a first protrusion protruding from one side of a lower surface of the hole insertion portion; and
    a second protrusion formed to protrude from the lower surface of the hole insertion portion and formed to be spaced apart from the first protrusion.

6. The L-shaped bolt fastening structure of claim 5, wherein the first protrusion and the second protrusion are spaced apart from each other as much as a thickness of the L-shaped bolt such that the lower horizontal portion of the L-shaped bolt is disposed and fixed between the first protrusion and the second protrusion.

7. The L-shaped bolt fastening structure of claim 5, wherein the first protrusion has a height that is greater than a height of the second protrusion.

8. The L-shaped bolt fastening structure of claim 1, wherein the hole insertion portion has a form divided into two portions below the support portion.

9. The L-shaped bolt fastening structure of claim 8, wherein the hole insertion portion includes:
    a first protrusion protruding from one side of a lower surface of the hole insertion portion; and
    a second protrusion formed to protrude from the lower surface of the hole insertion portion and formed to be spaced apart from the first protrusion.

10. The L-shaped bolt fastening structure of claim 1, wherein the hole insertion portion has a ring shape.

11. The L-shaped bolt fastening structure of claim 1, wherein the L-shaped bolt further includes a locking groove having a groove shape and a certain angle in a bent inner portion of the bent portion.

12. The L-shaped bolt fastening structure of claim 1, wherein the fall prevention portion includes:
    a locking portion which has a ring shape and is supported on an upper surface of the hole guard; and
    a coupling hole which is formed inside the locking portion and into which the L-shaped bolt is inserted.

13. The L-shaped bolt fastening structure of claim 12, wherein the L-shaped bolt further includes an upright auxiliary portion having a shape that protrudes from a bent outer portion of the bent portion.

14. The L-shaped bolt fastening structure of claim 13, wherein the fall prevention washer further includes a mounting groove formed in the locking portion such that the locking portion passes through the upright auxiliary portion to be mounted on the upper vertical portion of the L-shaped bolt.

15. The L-shaped bolt fastening structure of claim 12, wherein the locking portion further includes a plurality of cut portions formed inside the locking portion.

16. The L-shaped bolt fastening structure of claim 12, wherein the fall prevention washer further includes an insertion portion formed below the locking portion and inserted into the hole of the lower structure.

17. The L-shaped bolt fastening structure of claim 12, wherein:
   the locking portion is formed in a zigzag shape; and
   the fall prevention washer further includes an expansion portion which is formed to extend from the locking portion and allows a size of the coupling hole to be enlarged or reduced through elasticity thereof.

18. The L-shaped bolt fastening structure of claim 1, wherein the fall prevention washer includes:
   a ring portion having a ring shape and a coupling hole into which the L-shaped bolt is inserted;
   a protrusion protruding from one side of the ring portion; and
   an expansion portion having divided portions formed by being divided from the other side of the ring portion, wherein a distance between the divided portions is increased by an external force and decreased by elasticity thereof.

* * * * *